Dec. 31, 1935.  A. F. HOWE  2,026,041
MACHINE FOR OPERATING ON HEEL BLANKS
Filed July 22, 1933  11 Sheets-Sheet 2
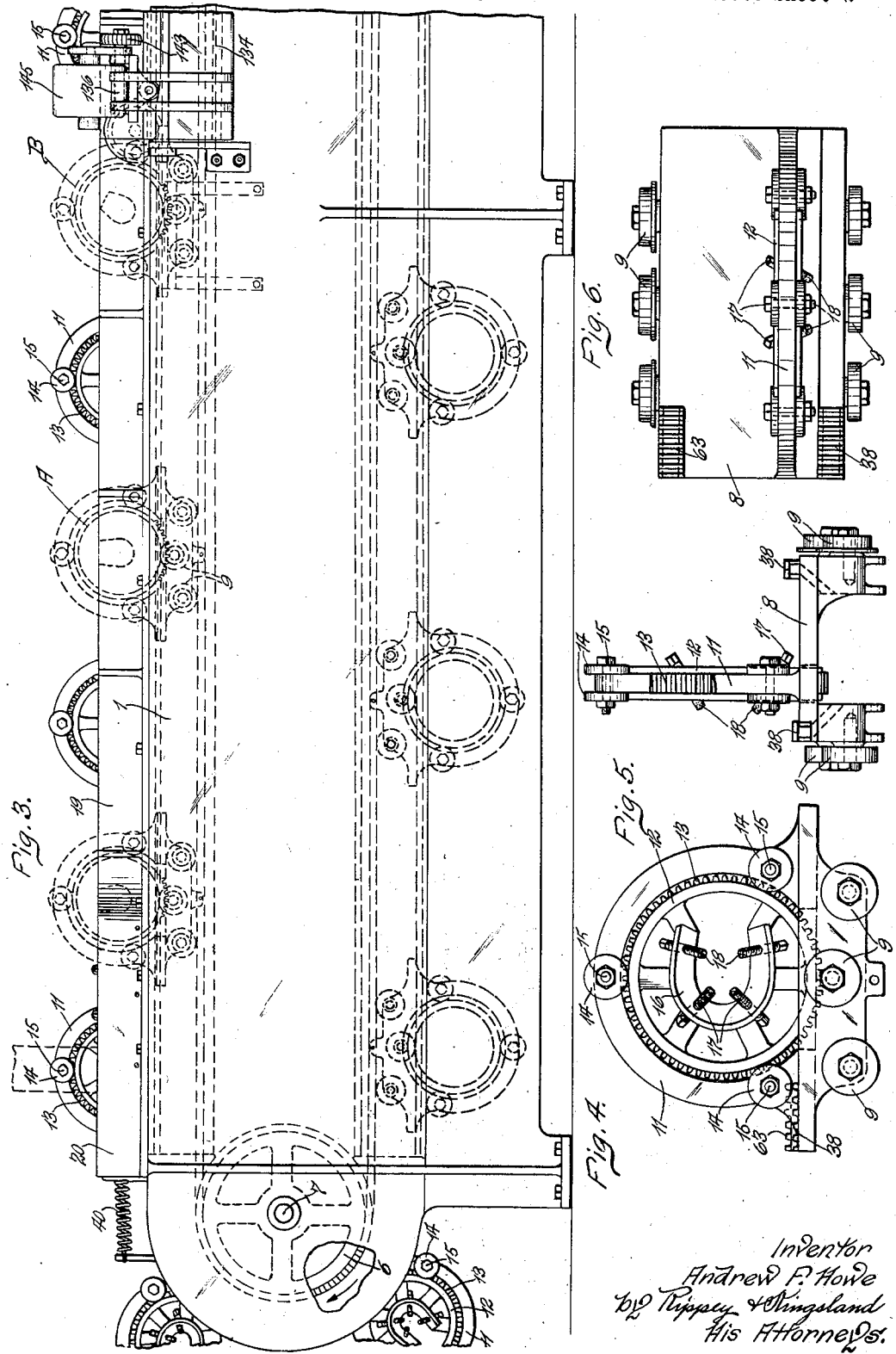

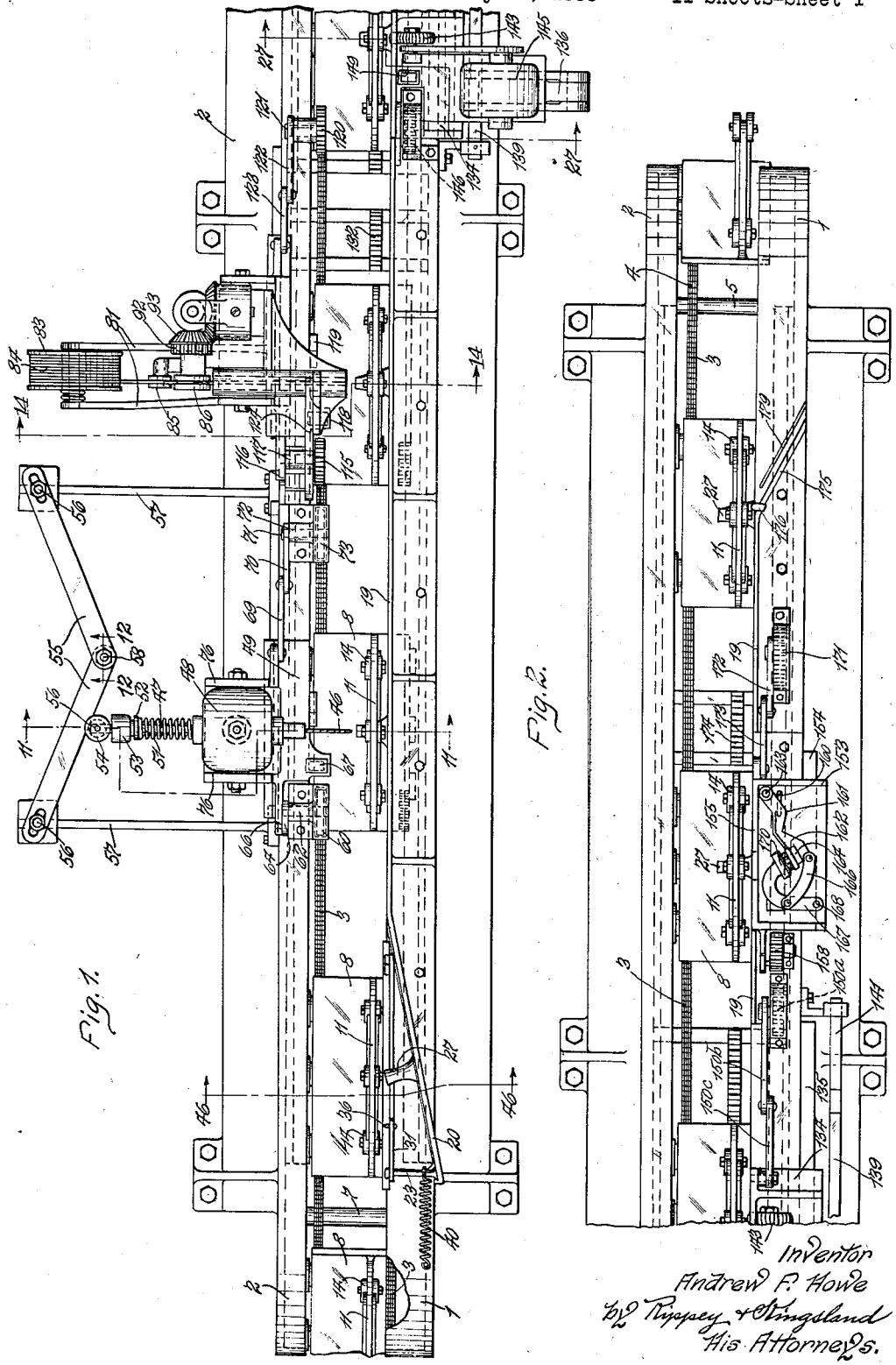

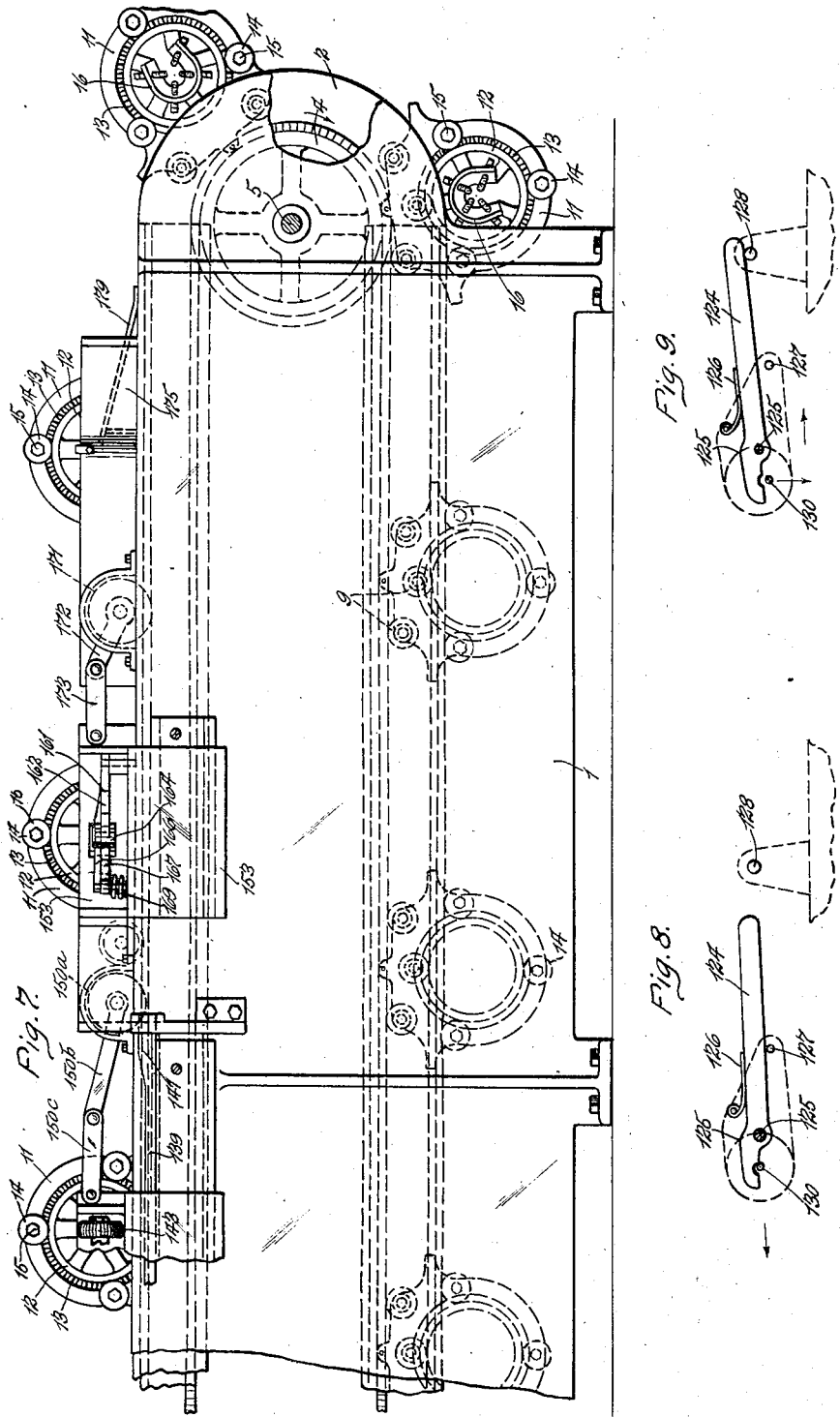

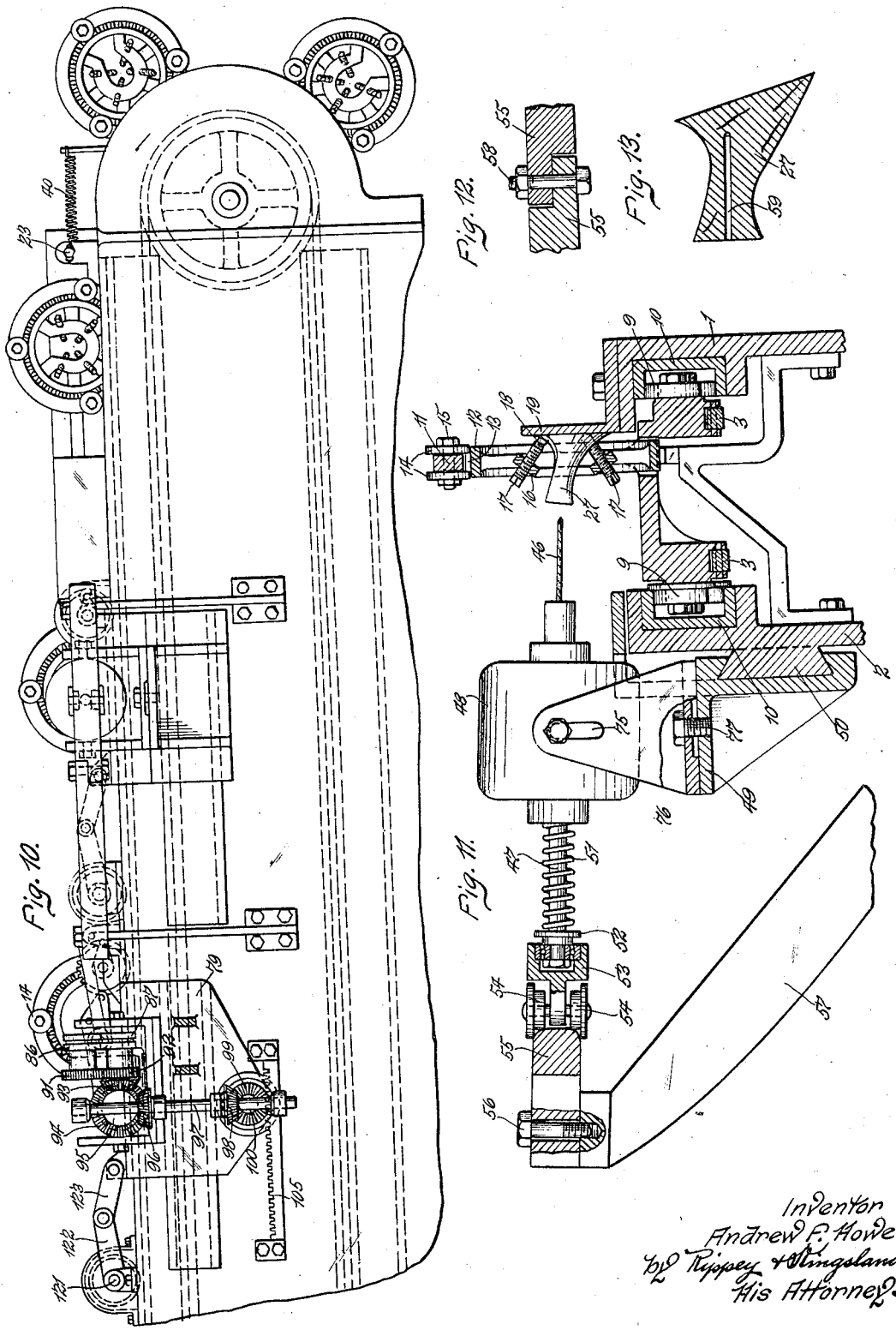

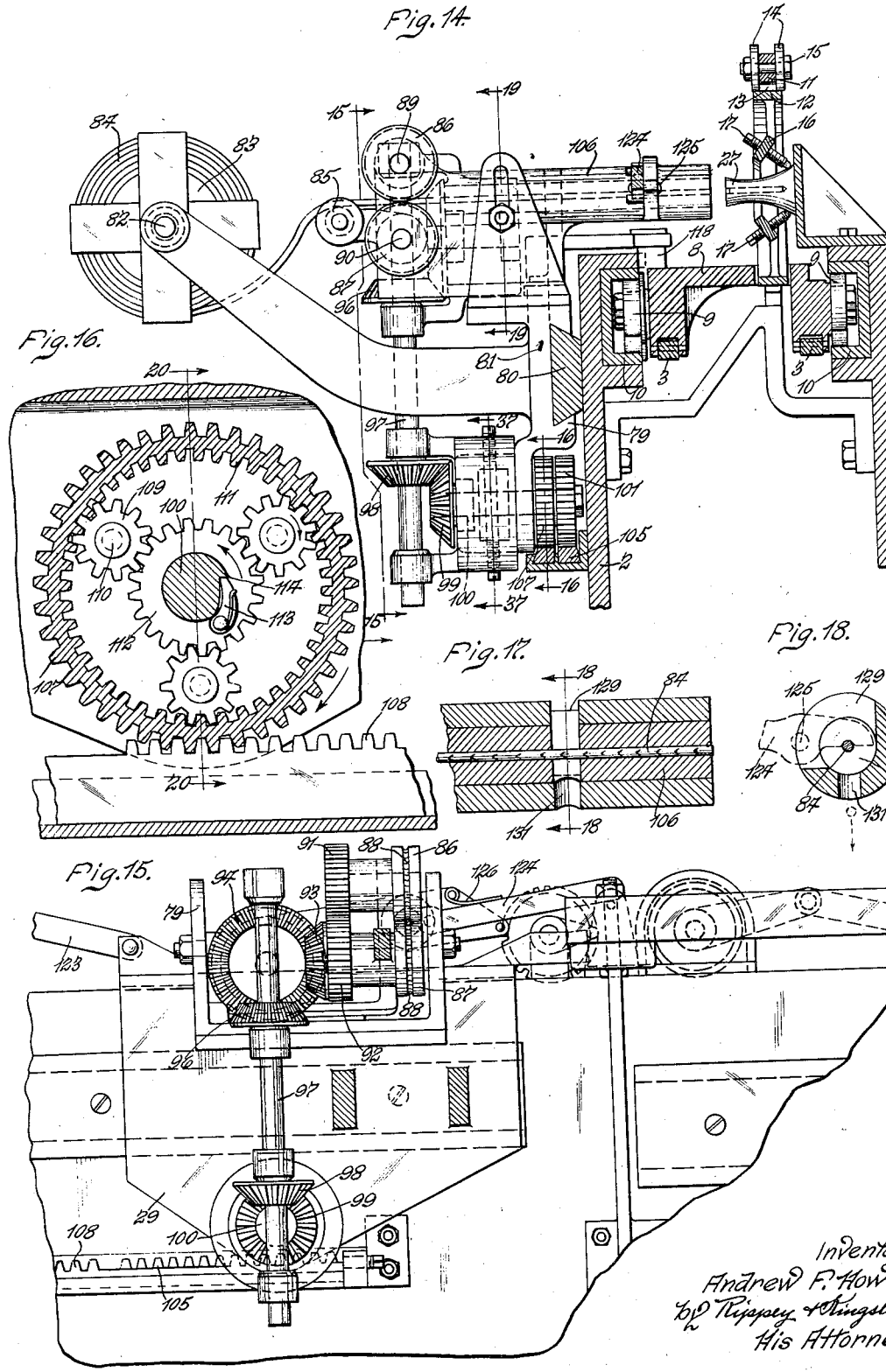

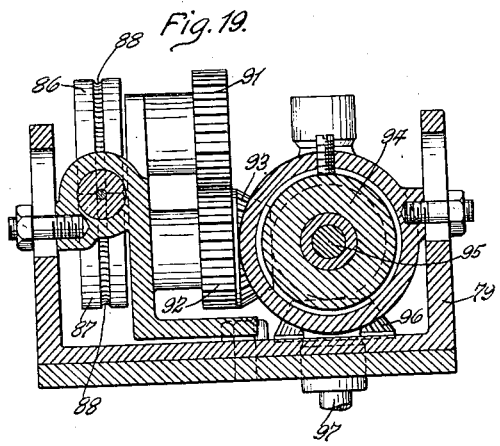
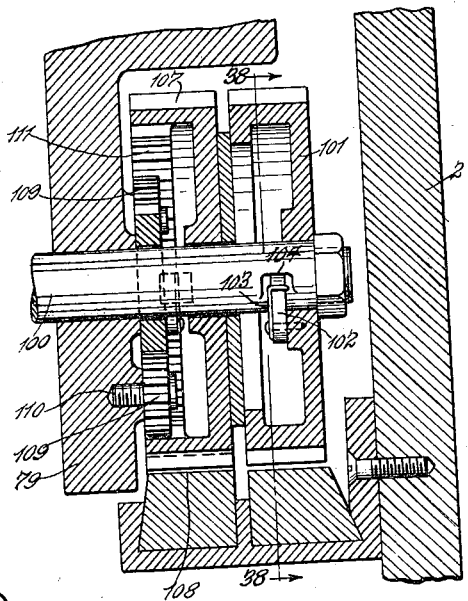
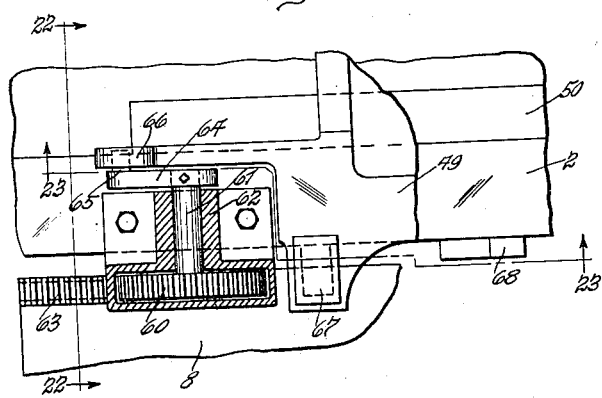
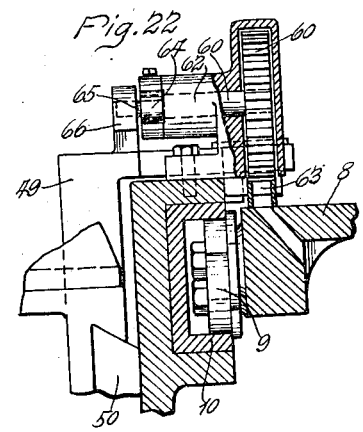
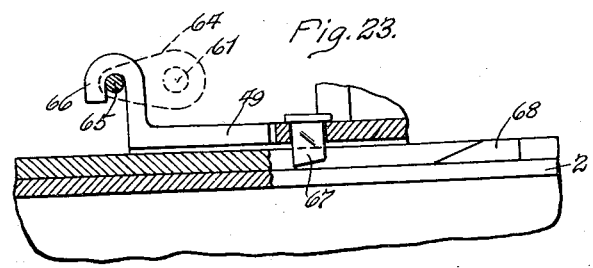
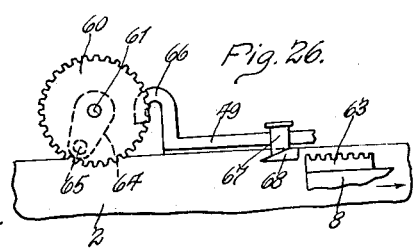
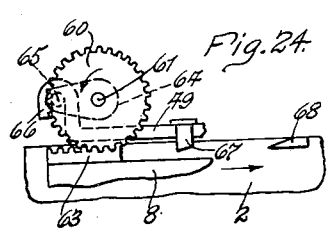
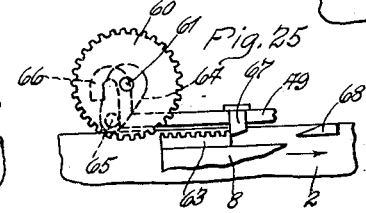

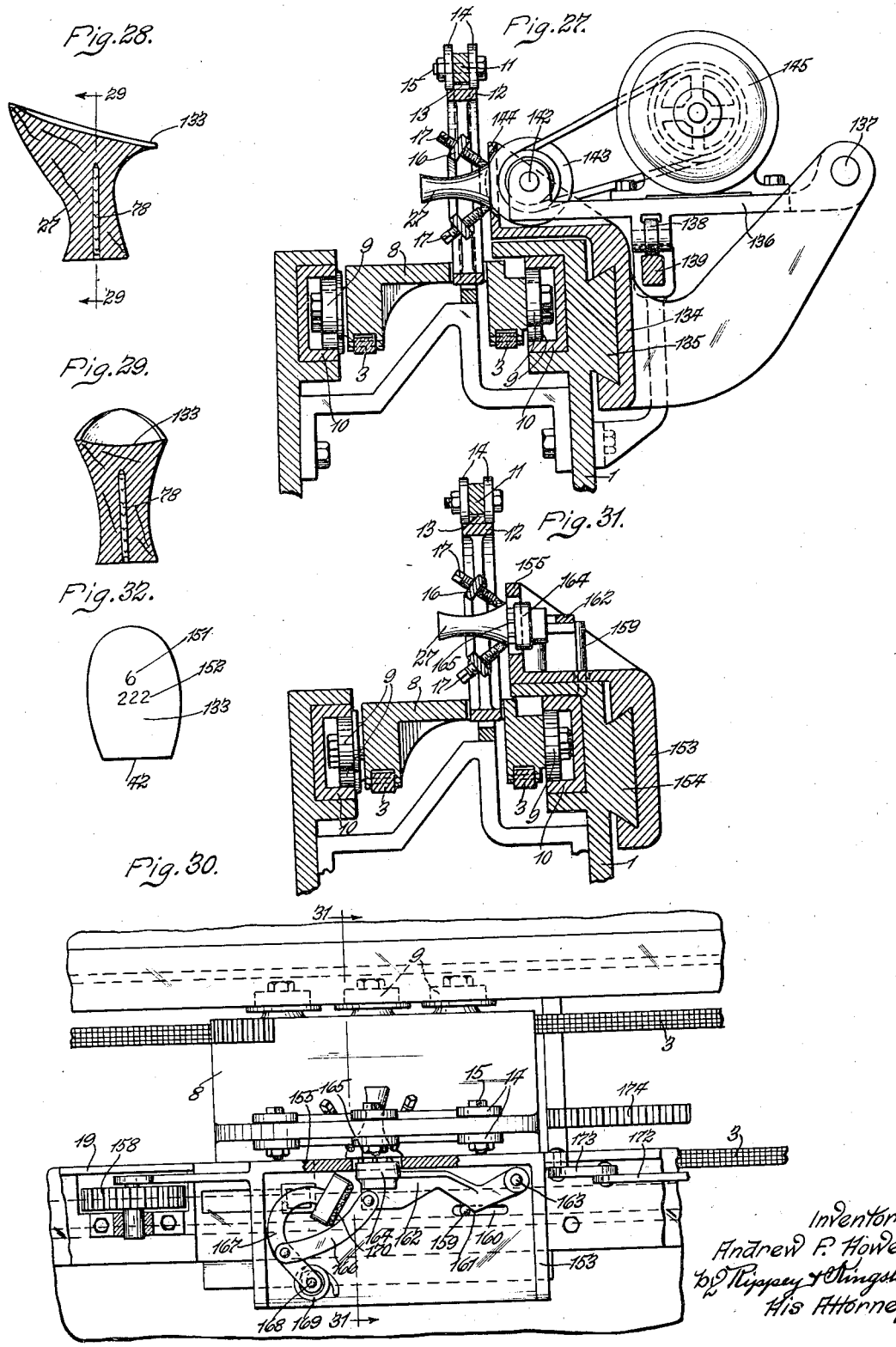

Dec. 31, 1935.    A. F. HOWE    2,026,041
MACHINE FOR OPERATING ON HEEL BLANKS
Filed July 22, 1933    11 Sheets-Sheet 8
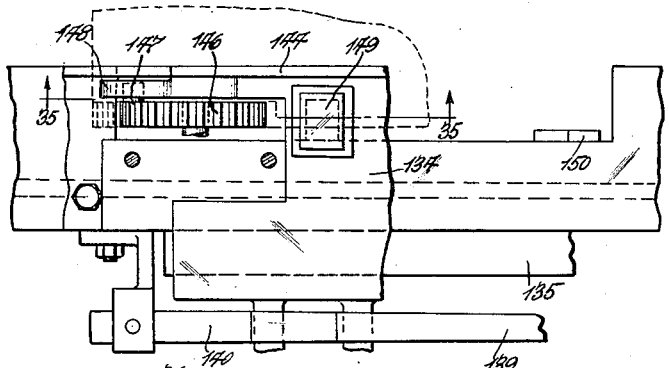
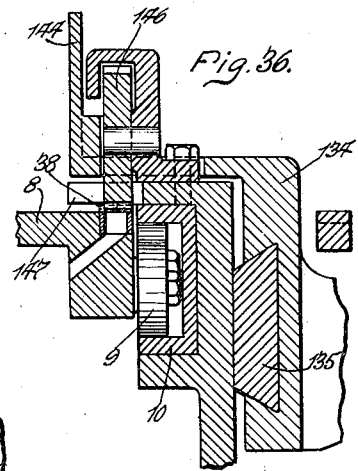
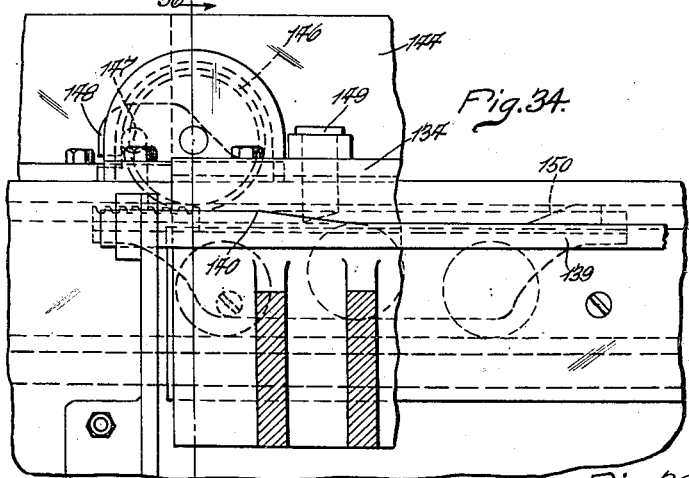
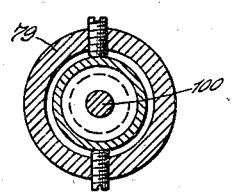
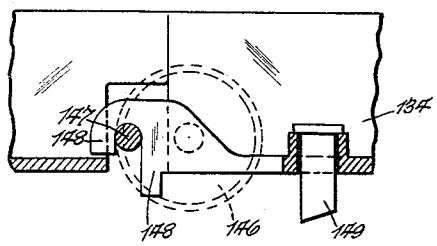
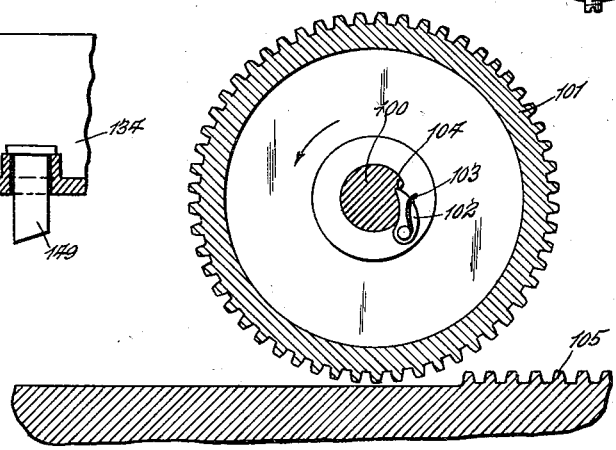
Inventor
Andrew F. Howe
by Rippey & Kingsland
His Attorneys

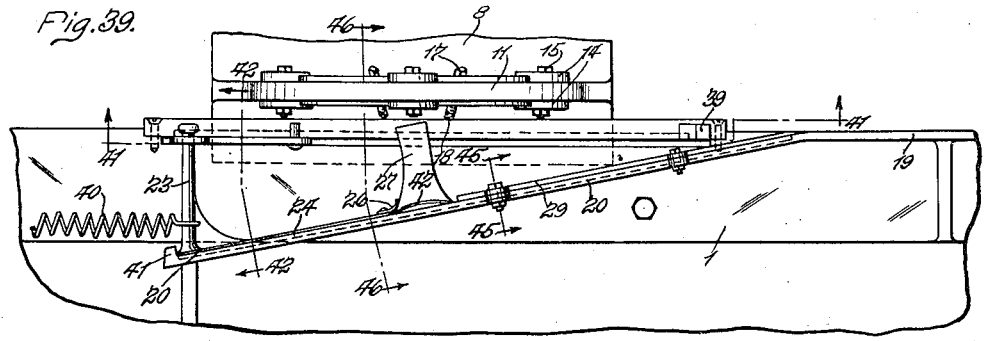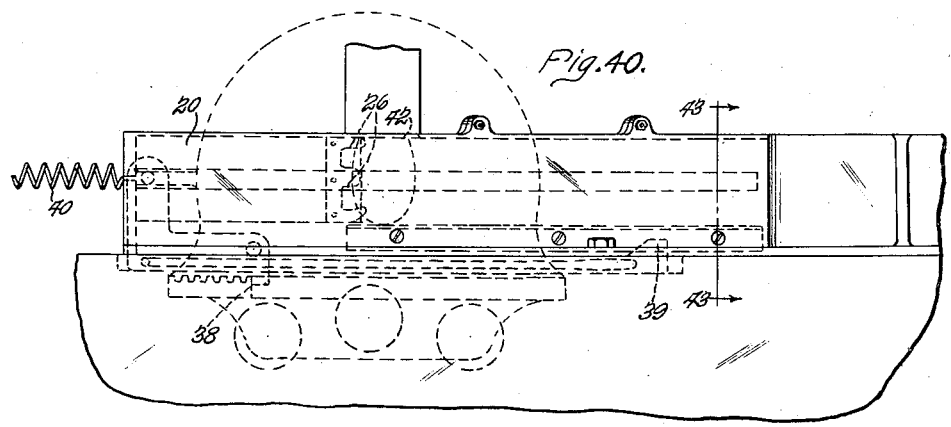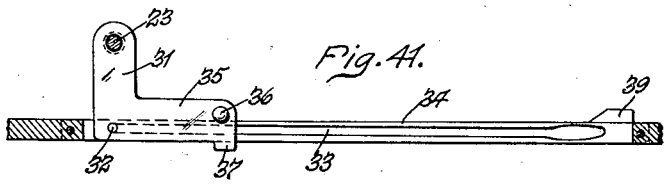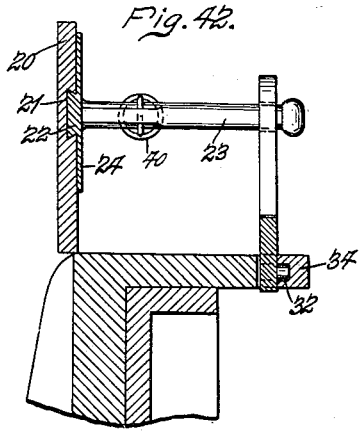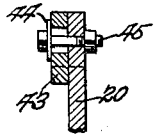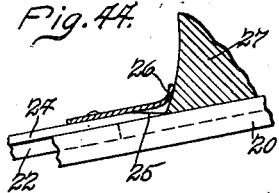

Dec. 31, 1935.  A. F. HOWE  2,026,041
MACHINE FOR OPERATING ON HEEL BLANKS
Filed July 22, 1933    11 Sheets-Sheet 10
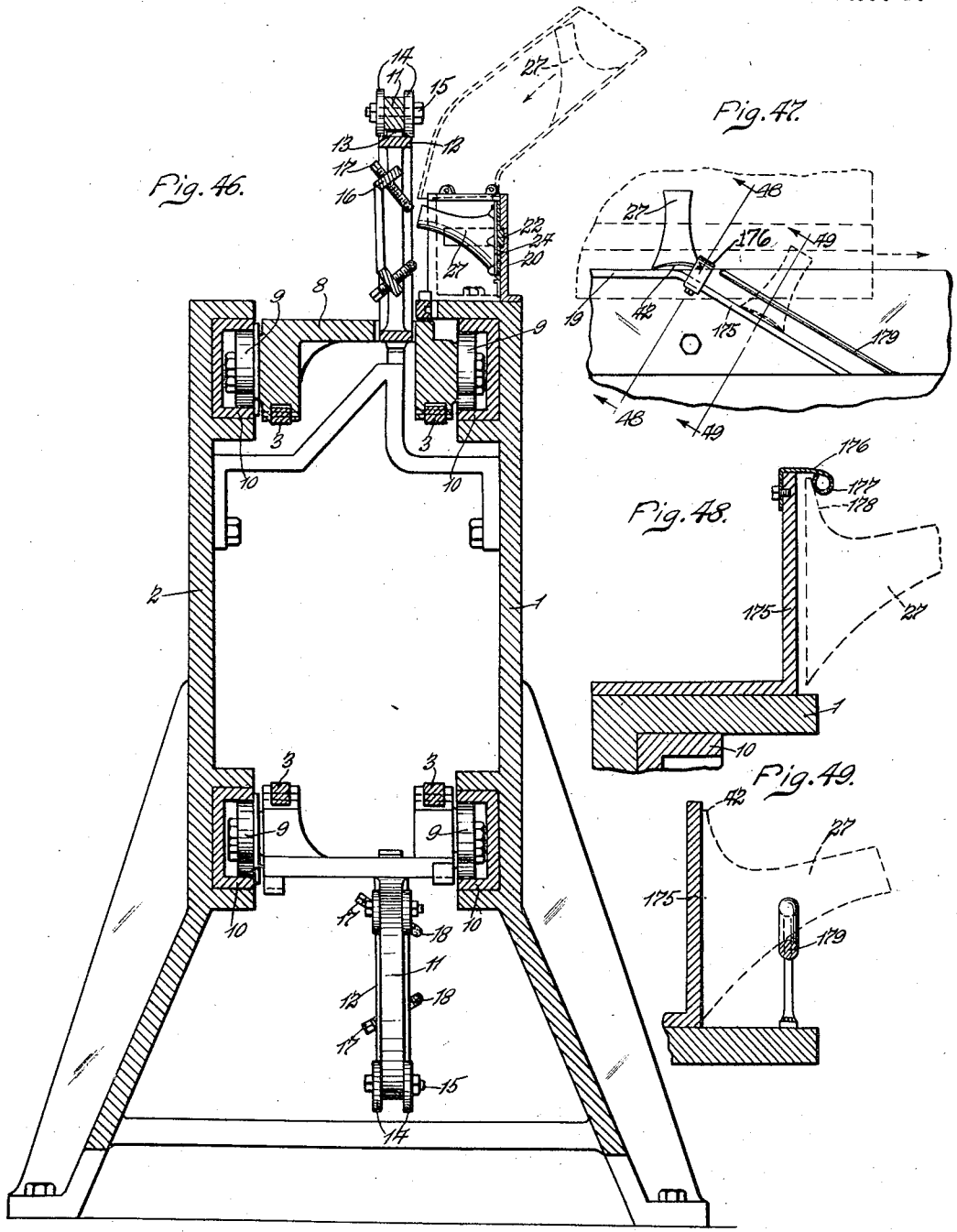
Inventor
Andrew F. Howe
by Tuppey & Kingsland
His Attorneys

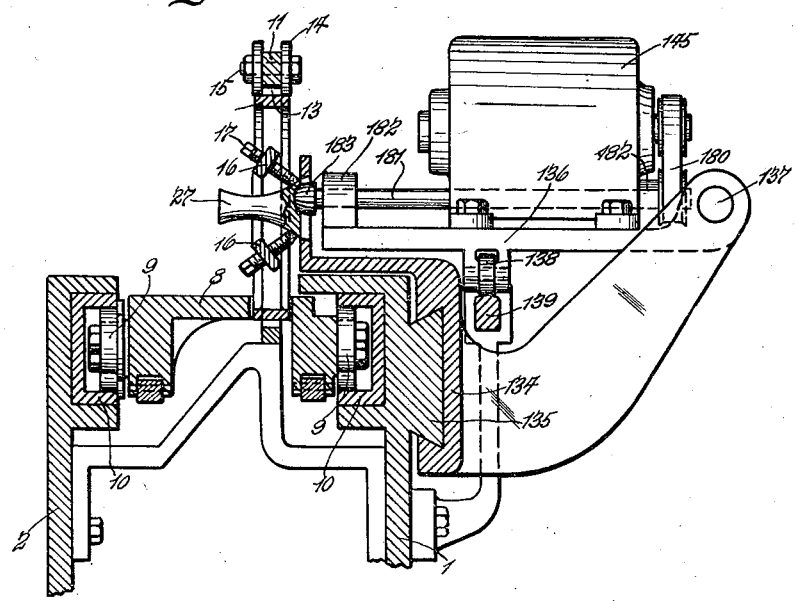

Patented Dec. 31, 1935

2,026,041

UNITED STATES PATENT OFFICE 2,026,041

MACHINE FOR OPERATING ON HEEL BLANKS

Andrew F. Howe, University City, Mo., assignor to United Wood Heel Company, St. Louis, Mo., a corporation of Delaware Application July 22, 1933, Serial No. 681,691

49 Claims. (Cl. 12—42)

This invention relates to machines for operating on heel blanks, and has special reference to machines for shaping the upper ends of the blanks for attachment to the shoes, for inserting dowel pins in the bodies of the heels, and for applying classifying numbers or symbols to the heels.

In one aspect, the present invention comprises a machine including selected tools and devices designed and adapted to operate on the heel blanks after the heel blanks have been shaped as disclosed by my copending applications, Serial No. 581,983, filed December 18, 1931, and Serial No. 671,867, filed May 19, 1933, although the present machine is not dependent upon the machines of said applications, but will operate to form the cavities in the upper ends of heel blanks, to apply the dowel pins in the bodies of the heel blanks, and to apply numbering and classifying symbols to the heel blanks irrespective of the type of machine or mechanism operating to form the breast and outer walls of said blanks.

Objects of the invention are to provide a machine comprising one or more continuously moving jacks equipped with mechanism for receiving and supporting and carrying a heel and for inserting longitudinally in the bodies of the heels dowel pins or reinforcing elements during continuous movement of the jack or jacks; to remove excess material from the upper end of the heels and form an appropriate concavity needed or required in order to prepare each heel for attachment to a shoe; to impress or imprint upon or in connection with each heel a designating number or symbol classifying the heel as to size or shape, or for other purposes, during the continuous movement of the jack supporting the heel; and to discharge the heels from the respective jacks automatically during continuous movement thereof.

One special feature of my invention comprises a coordinated operation of the continuously moving jacks with devices and tools, whereby, during continuous movement of the jacks, dowel pins or reinforcements are inserted or embedded in the heel bodies and concavities are formed in the upper ends of the heels, and said tools and devices are caused to perform their functions during travel from starting positions in accompaniment with the movement of the jacks, and to return said tools and devices to said starting positions preparatory for other operations after performance of their functions on the respective heels, and another object of the invention is to provide a machine having these mechanisms coordinated and arranged whereby the movements thereof are automatically controlled by the mechanism that operates the jacks, so that there is no possibility for these mechanisms becoming relatively disarranged.

Various other objects and advantages of the machine will be apparent from the following description, reference being made to the annexed drawings, in which—

Fig. 1 is a plan view of a portion of the front end of the machine showing the loading devices and the mechanisms for applying the dowel pins and forming the concavities in the upper ends of the heel blanks.

Fig. 2 is a plan view of the rear portion of said machine showing a portion of the mechanism for forming the concavity and also showing the mechanism for imprinting or applying the designating symbols or characters and discharging the heels from the machine.

Fig. 3 is a side elevation of that part of the machine shown in Fig. 1.

Fig. 4 is a side elevation of one of the continuously moving jacks that support the heel blanks.

Fig. 5 is an end elevation of the jack with a part of the frame broken away.

Fig. 6 is a plan view of the jack.

Fig. 7 is a side elevation of that part of the machine that is shown in Fig. 2.

Fig. 8 is a diagrammatic view illustrating a part of the mechanism and the operation thereof for cutting the dowel members.

Fig. 9 is a diagrammatic view of said mechanism at another stage of the operation thereof.

Fig. 10 is a side elevation showing the opposite side of that portion of the machine shown in Fig. 3.

Fig. 11 is a vertical cross sectional view approximately on the line 11—11 of Fig. 1.

Fig. 12 is an enlarged cross sectional view on the line 12—12 of Fig. 1.

Fig. 13 is a sectional view of a heel blank after the holes for the dowel pins have been formed in the blank.

Fig. 14 is an enlarged cross sectional view approximately on the line 14—14 of Fig. 1.

Fig. 15 is a sectional view on the line 15—15 of Fig. 14.

Fig. 16 is an enlarged sectional view on the line 16—16 of Fig. 14.

Fig. 17 is a detail sectional view of the dowel pin cutting device.

Fig. 18 is a cross sectional view of the dowel pin cutting device on the line 18—18 of Fig. 17.

Fig. 19 is a sectional view on the line 19—19 of Fig. 14.

Fig. 20 is a sectional view on the line 20—20 of Fig. 16.

Fig. 21 is a plan view with parts in section of the mechanism for moving the drilling carriage with the jack and for releasing said carriage from the jack.

Fig. 22 is a sectional view of said mechanism on the line 22—22 of Fig. 21.

Fig. 23 is a sectional view of said mechanism on the line 23—23 of Fig. 21.

Fig. 24 is a view, partially diagrammatic, showing the position of the parts for moving the drilling carriage with the jack at the beginning of said movement.

Fig. 25 is a similar view showing the positions of said parts at a later stage of the movement of the drilling carriage with the jack.

Fig. 26 is a view showing the positions of said parts just before the drilling carriage begins its return movement to its starting position.

Fig. 27 is a cross sectional view on the line 27—27 of Fig. 1, showing a part of the mechanism for forming the concavity in the upper end of the heel blank.

Fig. 28 is a vertical front to rear sectional view of a heel after the dowel pin has been inserted and the concavity formed in the upper end of the heel.

Fig. 29 is a vertical transverse sectional view of said heel.

Fig. 30 is a plan view of the mechanism for applying numbers or symbols to the heels.

Fig. 31 is a cross sectional view of said mechanism on the line 31—31 of Fig. 30.

Fig. 32 is an upper end plan view of a heel after the number or identifying symbol has been applied thereto.

Fig. 33 is a plan view of a part of the mechanism for moving the concaving carriage by the jack.

Fig. 34 is a side elevation of said mechanism that is shown in Fig. 33.

Fig. 35 is a sectional view on the line 35—35 of Fig. 33.

Fig. 36 is a vertical sectional view on the line 36—36 of Fig. 34.

Fig. 37 is a sectional view on the line 37—37 of Fig. 14 showing a part of the drive for the mechanism that forms and applies the dowel device.

Fig. 38 is a sectional view on the line 38—38 of Fig. 20.

Fig. 39 is an enlarged plan view of the feeding-in mechanism whereby the heel blanks are placed in the jacks.

Fig. 40 is a side elevation of said mechanism.

Fig. 41 is a vertical sectional view on the line 41—41 of Fig. 39.

Fig. 42 is an enlarged vertical cross sectional view on the line 42—42 of Fig. 39.

Fig. 43 is a vertical sectional view on the line 43—43 of Fig. 40.

Fig. 44 is a detail view of one of the spring fingers that positions the heel blanks preparatory for insertion in the jacks.

Fig. 45 is a detail sectional view on the line 45—45 of Fig. 39.

Fig. 46 is a sectional view approximately on the lines 46—46 of Figs. 1 and 39.

Fig. 47 is a plan view of a part of the mechanism for discharging the heels from the jacks after completion of the operation of this invention on the heel.

Fig. 48 is an enlarged sectional view on the line 48—48 of Fig. 47.

Fig. 49 is an enlarged sectional view on the line 49—49 of Fig. 47.

Fig. 50 is a cross sectional view of the machine on the line 27—27 of Fig. 1 showing an alternative type of mechanism for forming the concavity in the upper end of the heel.

Fig. 51 is a plan view of said alternative type of mechanism.

This invention may be applied to many different uses. Merely as a matter of convenience I have illustrated a specific embodiment and described an operation of a machine for operating on heel blanks. However, it is clear that many inventions and features of invention embodied in this new machine may be used for other purposes than for performing operations on heel blanks with little or no substantial variation in construction, arrangement and mode of operation of the machine. I consider broadly new an arrangement and cooperative relationship of the continuously moving jacks for supporting the work irrespective of whether the work is to be formed into a heel or some other object, in combination with a carriage for supporting a drill for drilling a hole in the work, and mechanism for moving said carriage from a starting position in accompaniment with the jack and the work supported thereby and then returning the carriage to said starting position for subsequent operations, and causing the drill to drill a hole in the work during at least a portion of the movement of the carriage with the work. Obviously different tools for different purposes may be used instead of drills.

Further, I consider broadly new the continuously moving jack for supporting the work in which a hole is provided, in combination with a carriage for supporting a dowel pin element, and mechanism for moving said carriage from a starting position in accompaniment with the jack and forcing the dowel pin element into the hole in the work during at least a portion of the movement of the carriage with the work, and then returning the carriage to said starting position for subsequent operations.

In addition, I consider broadly new the foregoing arrangement of elements or essential parts thereof, in combination with imprinting, engraving or marking devices for imprinting, engraving or marking on the heel, or other article formed by the machine, a designating number or symbol during continuous movement of the jack with the work therein, and thereafter discharging the article from the jack.

*The jacks and the operating mechanism*

The operating mechanism of the machine is supported by a pair of upright horizontally elongated side frames 1 and 2. A pair of endless conveyor chains 3 are mounted on and operated by wheels 4 attached to a rotary shaft 5 rotatively supported at one end of the machine and on wheels 6 mounted on a rotary shaft 7 supported at the opposite end of the machine. Either of the shafts 5 or 7, preferably the shaft 5, is positively driven by an appropriate driving mechanism (not shown). Jack supporting frames 8 are connected with and operated by the chains 3 and have triangular series of rollers 9 (Figs. 4 and 5) operating against the upper and lower walls of channel rails 10 rigid on the frames 1 and 2.

An annular frame 11 is rigidly supported by each jack frame 8. A circular support 12 is mounted for turning movements in each frame 11 and is formed with a circumferential series of gear teeth 13. Rollers 14 mounted at the opposite sides of the frame 11 on axle members 15 clampingly engage the annular frame 12 at opposite sides of the teeth 13. The axes of the axles 15 are parallel with each other and with the axis of the annular member 12. These rollers 14 clamp against the periphery of the anular frame 12 at both sides of the teeth 13 and hold said frame from accidental or undesired rotation but permit said frame to be forcibly rotated during the forward movement of the jack when the rack teeth 13 engage a rigid or stationary rack during such forward movement.

An approximately U-shaped or horseshoe shaped portion 16 is rigidly supported within each frame 12 and a series of clamps 17 are screwed through holes in said part 16 in converging relationship. These clamps may be turned to different adjusted positions with respect to the support 16 and with respect to each other in order to obtain clamping engagement with heel blanks of different sizes and styles. Each of the clamps 17 is equipped with an elastic clamping member 18 which will clamp firmly against the surfaces of the heels without defacing or damaging said heels.

Placing the heels in the jacks

Along the upper side of the rail of the frame 1 a vertical guide 19 is rigidly attached (Figs. 1 and 11). A vertical guide 20 extends obliquely outwardly from the forward end of the guide 19 (Figs. 1, 39 and 40) and has a horizontal dovetail groove 21 along its inner side. An angular member, comprising an arm 22 and an inwardly extended arm 23, is engaged in the groove 21 and mounted for sliding movements along said groove from a starting position near the outer end of the guide 20 toward the inner end of said guide 20, which is connected with the forward end of the guide 19.

A plate 24 having an attenuated inner end 25 (Fig. 44) is attached to the arm 22. A spring clip, comprising a number of spaced curved resilient fingers 26, is attached to the inner end of the plate 24 in position to press against the adjacent curved side wall of a heel blank 27 placed with its upper end against the guide 20 with the breast wall of the heel blank upwardly. A vertically adjustable guide, comprising a plate 28 and an inwardly extended flange 29, is attached to the lower portion of the guide 20 by clamping devices 30 which permit vertical adjustment of the plate 28. When the heel blank 27 is placed in engagement with the resilient fingers 26, the lower edge of the upper end of the heel blank seats upon the flange 29 and cooperates with the fingers 26 to support the blank in position to be moved along the guide 20 with one of the jacks, so that the body of the heel blank will be extended between and engaged with the elastic terminals 18 of the clamping members 17. The inner end of the arm 23 projects through a hole in the upper end of an angular member 31 having a pin 32 mounted for sliding movements along a slot 33 in a support 34 attached to the frame 1 (Figs. 41 and 42). The other arm 35 of the member 31 has a pin 36 riding on the support 34 and has a downwardly extended shoulder 37 in position to be engaged by the front end of a rack 38 in connection with the jack frame 8. Thus, the jack frame will move the member 31—35 along with the jack frame and said member 31—35 will move the arm 23 and thereby the parts 22, 24 and 26, thus moving the heel blank 27 along the guide 20, which causes the heel blank to move inwardly and to extend the body of the heel blank through the part 16 of the rotary frame 12 between the elastic terminals 18 of the clamping members 17. About the time that the heel blank passes from the inclined guide 20 to the straight guide 19, the pin 36 engages and rides upwardly on a cam 39 (Figs. 39 and 41), thereby raising the shoulder 37 above and out of engagement with the rack 38, whereupon the spring 40 retracts to move the slide, of which the plate 24 is a part, to its starting position at the outer end of the outwardly inclined guide 20 preparatory for another operation. The said slide of which the plate 24 is a part is stopped in its starting position against the outer portion of the guide 20 by an appropriate abutment 41 (Fig. 39).

During the time that the jack moves opposite the heel blank 27 and opposite the guide 20, the open end of the part 16 is up and the rounded closed end, which is shaped in conformity with the shape of the rear upper portion of the heel blank, is down. Thus, the heel blank, which is placed with the rounded part of the heel blank down and on the flange 29, is in position to be moved into the part 16. When the jack rack 38 engages the shoulder 37, the slide 24 and the resilient fingers 26 are moved along the guide 20, thereby moving the heel blank 27 along said guide 20 and along the flange 29. The horizontal end wall of the shank 42 of the heel blank engages under and against an adjustable guide 43 attached to the guide 20, thereby preventing the heel blank from twisting or turning. The guide 43 has vertical slots 44 through which the supporting clamps 45 extend, obviously permitting vertical adjustment of said guide 43 with respect to the flange 29 and with respect to the guide 20 so as to adapt these parts to support heel blanks of different sizes and styles.

When the heel blank passes from the guide 20 to the guide 19, said heel blank is in position in the jack and is clampingly engaged by the elastic parts 18 of the clamping members 17 and is firmly and securely held.

Forming the holes for the dowels

After the heel blank is placed in the jack and during continuous and uninterrupted movement of the jack and continuous and uninterrupted movement of the heel blank along the guide 19, a hole for the dowel pin is formed in the heel blank by a drill 46 attached to a rotary shaft 47 rotated by a motor 48 mounted in the movable carriage 49. The carriage 49 is mounted for sliding movements along a support 50 (Fig. 11) rigid with the frame 2. The shaft 47 is capable of longitudinal movement transversely of the machine during rotation of said shaft, motors equipped with these longitudinally movable shafts rotated by the motors being available commercially. A spring 51 is mounted on the shaft 47 having one end abutting against the motor frame and the opposite end bearing against a shoulder 52 in connection with the shaft 47 and said spring acts to move said shaft 47 longitudinally in an outward direction from the jack in which the heel blank is mounted. A bracket 53 is swiveled on the outer end of the shaft 47 and supports a pair of flanged rollers 54 having their peripheries operating against the inner edges of a pair of angularly disposed rails 55 while the flanges of said rollers operate against the upper and lower sides of said rails. These rails 55 have slots at their outer ends and clamping members 56 extend through said slots and engage the outer ends of arms 57 rigidly supported by the frame 2. The adjacent ends of said rails 55 are connected by a pivot 58. This construction permits the angle of relative inclination of said rails 55 to be varied, as desired. These rails function to move the shaft 47 and thereby the drill 46 longitudinally toward the opposite side of the machine when the carriage 49 is moved from its starting position along the support 50 during the initial portion of such movement of said carriage and until the rollers 54 pass beyond the angle formed by the two angularly disposed rails 55. When the rollers 54 pass beyond said angle of said rails 55, the spring 51 extends to move the shaft 47 longitudinally away from the jack in which the heel blank is mounted. During the time that the shaft 47 and the drill 46 are moved toward the heel blank, said drill 46 drills in the heel blank a hole 59 for a dowel pin (Fig. 13). This hole does not extend entirely through the heel blank but extends a considerable distance from the end of the body of the heel blank through the body. When the rollers pass beyond the angle of the rails 55, the spring 51 withdraws the drill from the hole that had been drilled in the heel blank, during all of which time the shaft 47 is rotating so as to withdraw from said hole all fragments and pieces that had been formed by the drill.

A gear wheel 60 (Fig. 21) is attached to a shaft 61 journalled for rotation in a bearing 62 attached to the side frame 2 and during forward movement of the jack is engaged and turned by a rack 63 rigid with the jack frame 8. A crank arm 64 is attached to the shaft 61 and has an outwardly extended member 65 engaging an upwardly extending arm 66 rigid with the carriage 49. When the gear 60 is turned by the rack 63 during forward movement of the jack, the first effect is to move the carriage 49 along with the jack but at slower speed than the jack is moving because the pin 65 operates outwardly against the arm 66. At the proper time, the carriage 49 is moved at the same speed as the jack and during that interval of time the drill 46 quickly drills the hole 59 in the heel blank 27 and is retracted from said hole. When the rack 63 passes out of engagement with the gear wheel 60, said rack engages an abutment 67 supported for vertical sliding movements by the carriage 49 (Figs. 23 to 26) and thereby moves said carriage 49 forwardly at the same speed as the jack is moving, and it is during this movement of the carriage 49 that the drill 46 drills and is withdrawn from the hole 59. After the drill 46 is withdrawn from the hole 59, the abutment 67 engages and rides upon a cam 68 rigid with the frame 2 and is thereby moved upwardly beyond and out of engagement with the rack 63, permitting the carriage 49 to be returned to its starting position.

A link 69 (Fig. 1) has one end pivoted to the carriage 49 and the opposite end pivoted to an arm 70 rigid with a shaft 71 rotative in a bearing 72 mounted on the frame 2. A gear wheel 73 is attached to the inner end of the shaft 71 and is engaged and turned by the rack 63 after the abutment 67 has been disengaged from said rack, which is after the drill 46 has been withdrawn from the hole 59 in the heel blank 27. This turning of the gear 73 rotates the shaft 71 and thereby operates the connections 70 and 69 between the shaft 71 and the carriage 49 and moves said carriage to its starting position, causing the arm 66 to engage and move the pin member 65 to its starting position, as shown in Figs. 23 and 24.

Because the flat upper end of the heel blank seats against the guide 19, the body of the heel blank extends upwardly toward the frame 2. The motor 48 and the shaft 47, as well as the drill 46, are supported at an angle of inclination, so that the drill 46 extends downwardly toward the frame 1 but preferably at a slightly less angle of inclination than the angle of inclination of the body of the heel blank 27. By this arrangement, the drill 46 will drill a hole in the body of the heel blank 27 that inclines from the center of the end of said body slightly toward the breast wall adjacent to the upper end of the heel blank in order not to be engaged by a usual fastening screw sunk into the upper end of the heel to attach the heel to the shoe. This angle of inclination of the drill 46, the shaft 47 and the motor 48 is variable by an adjustable support for said motor comprising clamping members 74 (Fig. 11) extending through slots 75 in the supporting bracket 76 forming a part of the carriage 49 and permitting raising and tilting of the motor to different positions, as desired.

Further, the motor may be turned about a vertical axis comprising a clamping pivot 77 for securing the bracket 76 to the frame of the carriage 49 in different positions, as desired.

*Forming and inserting the dowel member*

After the drill 46 has formed, and been withdrawn from, the hole 59 and after the carriage 49 has been returned to its starting position and after the rack 63 has passed out of engagement with the gear wheel 73, a dowel element 78 (Figs. 28 and 29) is formed and forced into the hole 59. Although the present machine comprises mechanism for forming said dowel element by cutting the same from the metallic strand and then forcing said dowel element into said hole 59, the dowel elements may be formed otherwise than by this machine and I do not restrict my claim of invention to a machine embodying dowel forming mechanism.

As shown, a carriage 79 is mounted for sliding movements along a support 80 (Fig. 14) rigid with the frame 2. This carriage has a pair of outwardly extended arms 81 supporting an axle 82 on which a rail or spool 83 is rotative. A wire or rod 84 is wound on the reel or spool 83 and extends therefrom over a guide roll 85 and thence between knurling feed rollers 86 and 87 and in peripheral grooves 88 in said feed rollers. The walls of the grooves 88 are roughened or ribbed in order to indent and roughen the wire or rod 84 fed through said grooves by the clamping action of the rollers 86 and 87 on said wire or rod and by rotation of said rollers 86 and 87. The roller 86 is attached to a rotary axle 89 and the roller 87 is attached to a rotary axle 90. A gear 91 attached to the axle 89 meshes with a gear 92 attached to the axle 90, which is rigid with a pinion 93 meshing with a gear 94 (Figs. 1, 15 and 19) supported for rotation on a horizontal axle 95. The gear 94 meshes with a pinion 96 attached to a vertical shaft 97 rotatively supported by the carriage 79 and having a pinion 98 rigid therewith and meshing with a pinion 99 on a horizontal axle 100 rotatively supported by the carriage 79.

A gear wheel 101 is mounted on the inner end of the axle 100 and supports a pawl 102 (Fig. 20) actuated by a spring 103 into engagement with the axle 100. A shoulder 104 on the axle 100 is engaged by the pawl 102 and the axle 100 is rotated thereby when the wheel 101 is rotated during movement of the carriage 79 from starting position. The gear 101 meshes with a rack 105 (Fig. 15) rigidly supported by the frame 2 during the initial portion of the movement of the carriage 79 from starting position of said carriage. This rotation of the shaft 100 through the gearing described rotates the rollers 86 and 87 to feed the wire or rod 84 transversely of the machine through a hardened steel guide 106 (Figs. 17 and 18). After the dowel element 78 has been formed and forced into the hole 59 in the heel blank, the gear 101 passes beyond and out of engagement with the rack 105, so that said gear 101 is no longer rotated and no longer rotates the axle 100, leaving said axle 100 free to be rotated in the opposite direction.

A gear 107 is mounted for relative rotation about the shaft 100 and, shortly after and about the time that the gear 101 passes out of engagement with the rack 105, said gear 101 passes into engagement with a rack 108 rigidly supported by the frame 2. The gears 101 and 107 are not engaged with the racks 105 and 108 at the same time. A number of pinions 109 are mounted on axles 110 supported by the carriage 79 and mesh with an internal gear 111 rigid on the inside of the gear 107 and also mesh with a pinion 112 mounted for relative rotation on and about the axle 100. Thus, the pinion 112 will be rotated when the gear 107 is rotated. A pawl 113 (Figs. 16 and 20) is pivotally supported by the pinion 112 and is adapted to engage a shoulder 114 on the axle 100 when the gear 107 is rotated during the final portion of the movement of the carriage 79 from its starting position and after the gear 101 has passed out of engagement with the rack 105. This gearing operated by the gear 107 rotates the axle 100 in the reverse direction from the direction in which the axle is rotated by the gear 101 and thereby rotates the feed rollers 86 and 87 in the reverse direction, causing said rollers to retract the wire or rod 84 and withdraw the projected end thereof from within the hole 59 and to position approximately even with the end of the guide 106 preparatory for another operation. These operations are performed during the time that the carriage 79 is moved from its starting position by and in accompaniment with the jack.

The carriage 79 is moved from its starting position and returned to said starting position by mechanism identical with the mechanism whereby the jack moves the carriage 49 from and to its starting position. This mechanism includes a gear 115 corresponding to the gear 60 and engaged and operated by the rack 63 and equipped with a crank device 116 similar to the crank device 65 and operating against a carriage part 117 in connection with the carriage 79 and similar to the carriage part 66 on the carriage 49, so that the carriage 79 is moved slowly and at increasing speed from its starting position by the movement of the jack adjacent thereto. When the rack 63 passes out of engagement with the gear 115, said rack engages an abutment 118 similar to the abutment 67 in order to move the carriage 79 at the same speed as that at which the jack is traveling. After the dowel element 78 has been formed and forced into the hole 59 and after the end of the wire or rod 84 has been retracted, the abutment 118 passes onto a cam 119 functioning like the cam 68 to disengage the abutment 118 from the rack 63. Thereafter, the rack 63 engages and rotates a gear 120 attached to a rotary shaft 121 having a crank arm 122 attached thereto and pivotally engaged with one end of a link 123, the opposite end of which is pivoted to the carriage 79 (Fig. 1). This rotation of the gear 120 by the rack 63 returns the carriage 79 to its starting position and during such return movement the wire or rod 84 is cut or broken to provide a dowel element 78. For this purpose, a lever 124 is mounted on a pivot support 125 rigid with that part of the carriage 79 in which the guide 106 is mounted (Figs. 8, 9 and 14). A spring 126 actuates the lever 124 in one direction and against a supporting lug 127. During the final portion of the movement of the carriage 79 toward its starting position, the free end of the lever 124 engages and is raised by a rigid member 128, thus forcing the opposite end of said lever 124 downwardly into a notch 129 in the guide 106 and the support therefor, causing said lever 124 to break or sever the wire or rod 84 by cutting or breaking out a small piece 130 of said wire or rod and discharging the same downwardly through a discharge hole 131. On the next movement of the carriage 79 from its starting position, the detached or severed end portion of the wire or rod 84, constituting the dowel element 79, is forced into the hole 59 with the end of said dowel element inwardly beyond the end of the heel body, so that no portion of the dowel element protrudes beyond the end of the heel body but is entirely within said body. The dowel element in the heel is not located axially but has its upper end inclined forwardly toward the wall 42, this relationship being obtained as a result of the forward inclination of the body of the heel blank and for the purpose of placing the upper end of the dowel element forwardly beyond the position to be engaged by or to interfere with the insertion of the central fastening screws or other fasteners that may be used in attaching the heel to the shoe. As shown, the dowel forming and inserting mechanism may be adjusted to conform to the adjustment of the drill that forms the hole for the dowel.

*Forming the concavity in the upper end of the heel*

After the dowel element has been inserted in the heel and after the wire or rod 84 has been retracted, the frame 12 is turned from the position indicated at A (Fig. 3) to the position indicated by B. This turning of the frame 12 is effected during continuous movement of the jack by the teeth 13 engaging a stationary rack 132 (Fig. 1).

The mechanism for forming the concavity 133 (Figs. 28 and 29) in the upper end of the heel is supported by a carriage 134 (Fig. 27) mounted for sliding movements along a support 135 attached to the frame 1. A support 136 has its outer end mounted on a pivot 137 on said carriage 134 and has a roller 138 operating on a cam rail 139, having at its forward end a raised portion 140 and at its rear end a raised portion 141 (Fig. 7). In the starting position of the carriage 134, the roller 138 is on the raised portion 144 of the rail 139 and, after traveling a short distance, the roller 138 descends from said raised portion 140 and, during the final portion of the forward movement of said carriage 134, the roller 138 rides upon the raised portion 141. Thus, during forward travel of the carriage 134 the support 136 descends and rises.

A shaft 142 (Fig. 27) is rotatively supported at the inner end of the support 136 and has a cutter 143 attached thereto. The axis of the shaft 142 is parallel with the direction of travel of the jack, but may be otherwise arranged as desired. The inner peripheral portion of this cutter 143 extends through an opening in a guide 144 rigid with the carriage 134 and located in exact alinement with the end of the guide 19, so that during travel of the jack the heel will be moved from said guide 19 to the guide 144. The shaft 142 is rotated by familiar driving connections operated by a motor 145 mounted on the support 136.

After the teeth 13 pass from engagement with the rack 132, the rack 38 engages and rotates a gear 146 supported by the frame 1 and having a crank pin 147 (Figs. 33 and 35) engaging a part 148 of the carriage 134, thereby moving said carriage 134 along with the jack at gradually increasing speed. When the rack 38 passes from engagement with the gear 146, said rack engages a vertically movable abutment 149 supported by the carriage 134 for vertical sliding movements exactly as the abutments 67 and 118 are supported by the carriages 49 and 79 for vertical sliding movements. During the time that the rack 38 is in engagement with the abutment 149, the carriage 134 is moved along with the jack and at the same speed and during this movement the cutter 143 operates to form the concavity 133 in the upper end of the heel 27. During the time that the cutter 143 operates on the heel 27 to form the concavity 133, said heel 27 is turned almost a complete revolution from the position indicated at B (Fig. 3) to a position in which the breast wall and the wall 42 of the heel extends in the opposite direction from the direction in which the jack is moving. In this way and during these operations the cutter 143 forms the proper concavity 133 in the upper end of the heel 27 during the descending travel and the horizontal travel and the ascending travel of the roller 138 along the rail 139 which similarly controls the cutter 143. After the concavity 133 has been formed, the sliding abutment 149 rides upon a cam 150 (Fig. 33) and is thereby raised above and out of engagement with the rack 38, making it possible for the carriage 134 to be returned to its starting position. After the abutment 49 is disengaged from the rack 38, said rack engages and turns the gear wheel 150ª attached to a crank member 150ᵇ connected by a link 150ᶜ with the carriage 134, whereby said carriage is returned to its starting position.

*Applying numbering and classifying symbols to the heels*

After the concavity 133 has been formed in the upper end of the heel, either numbering symbols 151 or classifying and style symbols 152, or both said numbering and classifying symbols, are formed or imprinted upon the upper end of the heel preferably within the concavity 133 (Fig. 32). A carriage 153 (Figs. 2, 7, 30 and 31) is mounted for sliding movements along a support 154 rigid with the frame 1. The carriage 153 supports a guide 155 in alinement with the spaced portions of the guide 19, so that when the upper end of the heel is moved from one portion of the guide 19 it will pass against the alined guide 155. A part 156 on the carriage 153 is engaged by a crank pin 157 projecting from a gear 158 rotatively supported by the frame 1 in the same manner that the gear 146 is supported by said frame 1. Said gear 158 is engaged and rotated by the rack 38 during forward continuous movement of the jack frame 8 just the same as the gear 146 is engaged and rotated by said jack during continuous forward movement of said jack frame. This turning of the gear 158 by the rack 38 moves the carriage 153 along with the jack frame 8, first at slower speed than the jack frame is moving and then during the final movements of the carriage 153 at the same or approximately the same speed as the speed at which the jack frame 8 is moving. A pin 159 is rigid with the frame 1 and projects through a slot 160 in the carriage 153 adjacent to a cam 161 formed on a pivoted type carrier 162. The type carrier 162 is mounted for swinging movements on a pivot 163 on the carriage 153. A type holder 164 (Figs. 30 and 31) holds a number of type or a logotype device 165 which may be removed for purposes of replacement and substitution so that different type or logotype may be mounted on the same type carrier in order to imprint different numbering or classifying symbols on different types or styles of heels. A link 166 has one end pivoted to the type carrier 162 and the opposite end pivoted to a curved lever 167 mounted on a pivot 168 supported by the carriage 153. A spring 169 is engaged with the carriage 153 and with the lever 167 and is operative to move the parts 162 and 167 from the positions shown in Fig. 30 to the positions shown in Fig. 2. An inking pad or fountain 170 is mounted on the free end of the lever 167 and, in the starting positions of the parts 162 and 167 (Fig. 2), is against or adjacent to the ends of the type 165.

During continued movement of the jack frame 8 and during the time that the carriage 153 is being moved along with said jack frame, the cam 161 is operated against the pin 159 in such a way as to impart a quick inward swinging movement to the type carrier 162 and strike the printing ends of the type quickly against the upper end of the heel effectively to imprint on the wall of the concavity 133 the numbering or classifying symbols, or both the numbering and classifying symbols 151 and 152. At this time the cam 161 quickly passes beyond the pin 159, permitting the spring 169 to retract said type carrier a distance sufficient to permit the heel to pass beyond the type 165 without blurring the imprinted numbers or symbols. About this time the rack 38 passes beyond and out of engagement with the gear 158 and thereafter into engagement with a gear 171 (Figs. 2 and 7), having a crank connection 172 with one end of a link 173, the opposite end of which link is connected with the carriage 153. This rotation of the gear 171 by the rack 38 quickly moves the carriage 153 to its starting position ready for the next imprinting operation when the next jack frame moves into cooperative relation thereto.

After the numbering or classifying symbols, or both, have been applied or imprinted upon the upper end of the heel, the teeth 13 engage a rigid rack 174 (Fig. 2) and thereby turn the frame 12 to position in which the wall 42 of the heel is upward. The work of this machine has now been completed with the exception of discharging the heel from the jack and from the machine.

Discharging the heel from the jack and from the machine

After passing from the imprinting mechanism, the heel is moved along with the jack to a guide 175 inclining outwardly from connection with the end of the guide 19 (Figs. 2 and 47). The outwardly inclined guide 175 adjacent to but beyond the end of the guide 19 supports a resilient arm 176 (Figs. 47 and 48), and the rolled end portion 177 is engaged by the forwardly extended portion 178 of the heel. The rolled end portion 177 of the member 176 is disposed angularly with respect to the direction of travel of the jack and the heel, so that the heel is deflected by said rolled portion 177 to position in which the upper end of the heel seats against the inner surface of the outwardly inclined guide 175 and continued forward movement of the jack causes the member 17 to push the heel along the guide 175 until said member 17 passes beyond and out of contact with the heel. The heel then rests upon a downwardly and outwardly inclined guide 179 along which the heel may slide to ultimate discharge therefrom.

In Figs. 50 and 51, an alternative type of mechanism for forming the concavity in the upper end of the heel is shown. This alternative form of mechanism differs only slightly from that type of mechanism shown in Fig. 27 and includes many of the parts. The same reference numerals are applied to like parts in Figs. 27, 50 and 51.

In Figs. 50 and 51, the motor 145 has driving connection 180 with a shaft 181 rotative in bearings 182 and extending at an angle with respect to the direction of movement of the jack frame. A cutting tool 183 is attached to the inner end of the shaft 181 and operated by said shaft effectively to form the concavity 133 in the upper end of the heel blank during continued movement of the jack and heel blank and during accompanying movement of the carriage 134 on which the cutting tool 183 and its operating mechanism are supported. These tools and elements may be varied in other particulars than as specifically illustrated and it should be understood that in this modified device the roller 138 operates along the cam rail 139 in order to raise and lower the cutting tool.

The foregoing description of the construction and arrangement of the various mechanisms includes a description of their successive operations, rendering it unnecessary to restate the operations of the various mechanisms.

The construction, arrangement and relationship of the parts of this invention may be varied as widely as the scope of equivalent limits will permit without departure from the nature and principle of the invention and, without restricting myself unessentially in any respect, I claim:—

1. In a machine of the character described, a continuously moving jack for supporting a blank from which an article is to be formed, means operated by the jack for moving the blank to position to be engaged by the jack, means for supporting the blank in said position to be engaged and moved by said jack during continuous movement of said jack, and means for moving said blank into the jack during movement of said blank by the jack.

2. In a machine of the character described, a continuously moving jack for supporting and moving a blank from which an article is to be formed, means operated by the jack for moving the blank to position to be engaged by the jack, means for supporting the blank in said position to be engaged by said jack and from which said blank is moved by said jack, a support along which said blank is moved by said jack, and means in connection with said support for moving said blank to proper position in connection with the jack.

3. In a machine of the character described, a continuously moving jack for supporting and moving a blank from which an article is to be formed, means operated by the jack for moving the blank to position to be engaged by the jack, means for supporting the blank in said position to be engaged by said jack and from which said blank is moved by said jack, a support along which said blank is moved by said jack, means in connection with said support for moving said blank to proper position in connection with the jack, means for holding said blank from lateral displacement in the jack, and means for working on one end of said work during continuous movement of said jack.

4. In a machine of the character described, a continuously moving jack for supporting a blank from which an article is to be formed, a stationary support for supporting the blank in position to be engaged by said continuously moving jack, a rigid guide engaging one end of said blank and holding said blank in the jack, and mechanism for operating on the opposite end of said blank.

5. In a machine of the character described, a continuously moving jack for supporting a blank from which an article is to be formed, a stationary support for supporting the blank in position to be engaged by said continuously moving jack, a guide engaging one end of said blank and holding said blank in the jack, and mechanism for inserting a dowel element in the opposite end of said blank during continuous movement of said blank by said jack.

6. In a machine of the character described, a continuously moving jack for supporting a blank from which an article is to be formed, a stationary support for supporting the blank in position to be engaged by said continuously moving jack, a guide engaging one end of said blank and holding said blank in the jack, mechanism for drilling a hole in the opposite end of said blank, and means for inserting a dowel element in said hole during continuous movement of said blank by said jack.

7. In a machine of the character described, a continuously moving jack, means for mounting and holding a blank in connection with said jack during continuous movement of said jack, and mechanism for inserting a dowel element in one end portion of said blank during continuous movement of said blank by said jack.

8. In a machine of the character described, a continuously moving jack, means operated by said jack for mounting a blank from which an article is to be formed in said jack during continuous movement of said jack, mechanism for forming a shaped surface on said article during continuous movement of said jack, and mechanism for drilling a hole in said blank opposite from said shaped surface during continuous movement of said jack.

9. In a machine of the character described, a continuously moving jack, means for mounting and holding a blank from which an article is to be formed in said jack during continuous movement of said jack, and mechanisms for drilling a hole and inserting a dowel element in said hole during continuous movement of said blank by said jack.

10. In a machine of the character described, a continuously moving jack for supporting a blank from which an article is to be formed, means for mounting and holding a blank in said jack during continuous movement of said jack, and mechanism for embedding a dowel element in said blank in position in which the outer end of said element is inwardly beyond the outer surface of said blank.

11. In a machine of the character described, a continuously moving jack for supporting and carrying a blank from which an article is to be formed, and mechanism for embedding in said blank a dowel element inclined with respect to the longitudinal axis of said blank and while said blank is in motion.

12. In a machine of the character described, a continuously moving jack for supporting a blank from which an article is to be formed, mechanism for drilling a hole in said blank inclined with respect to the longitudinal axis of said blank while said blank is moving, and mechanism for placing in said hole a dowel element.

13. In a machine of the character described, a continuously moving jack for supporting a blank from which an article is to be formed, mechanism for drilling a hole in said blank inclined with respect to the longitudinal axis of said blank while said blank is moving, and mechanism for placing in said hole a dowel element during continuous movement of said jack after said hole has been formed.

14. In a machine of the character described, a continuously moving jack for supporting a blank from which an article is to be formed, mechanisms for working successively on opposite ends of said blank while said blank is in motion, and mechanism for forcing a reinforcing element into one end of said blank after one of said mechanisms has worked on said one end of said blank.

15. In a machine of the character described, a continuously moving jack, a rotary support carried by said jack for supporting a blank from which an article is to be formed, and mechanism for forming a concavity in one end of said blank during rotation of said support and continuous movement of said blank.

16. In a machine of the character described, a continuously moving jack, a rotary support carried by said jack for supporting a blank from which a shoe heel is to be formed, and mechanism for forming a concavity in the upper end of said blank during rotation of said support and continuous movement thereof.

17. In a machine of the character described, a continuously moving jack for supporting a blank from which an article is to be formed, a stationary element holding said blank from lateral movement in one direction during movement thereof, and mechanism for working on the opposite end of the blank while said blank moves along said stationary element.

18. In a machine of the character described, a continuously moving jack for supporting a blank from which an article is to be formed, a stationary element holding said blank from lateral movement in one direction during movement thereof, mechanism for drilling a hole in the opposite end of the blank during movement of the blank along said stationary element, and mechanism for inserting a dowel pin in said hole.

19. In a machine of the character described, a continuously moving jack for supporting a blank from which an article is to be formed, a movable carriage, mechanism for moving said carriage from and to a definite starting position during continuous movement of said jack in one direction, means in said carriage holding said blank from displacement in said jack, and mechanism supported by said carriage for working on the adjacent portion of said blank during continuous movement of said blank and during movement of said carriage from said starting position.

20. A machine of the character described comprising a continuously moving jack for supporting a blank from which a wood heel is to be formed, mechanism at one side of said jack operative to insert a dowel element longitudinally in the body of said blank, and mechanism at the opposite side of said jack for working on the opposite end portion of said blank.

21. A machine of the character described comprising a continuously moving jack for supporting a blank from which a wood heel is to be formed, mechanism at one side of said jack operative to insert a dowel element longitudinally in the body of said blank, and mechanism at the opposite side of said jack for forming a concavity in the upper end of said blank.

22. In a machine of the character described, a continuously moving jack for supporting a blank from which a wood heel is to be formed, mechanism at one side of said blank for drilling a hole longitudinally in the body of said blank, mechanism at the same side of said jack for inserting a dowel element longitudinally in said hole, and mechanism at the opposite side of said jack for forming a concavity in the upper end of said blank.

23. In a machine of the character described, a continuously moving jack, mechanism at one side of said jack for inserting a dowel element longitudinally in said blank during continuous movement of said jack and said blank, a carriage supported at the opposite side of said jack, mechanism for moving said carriage from a starting position along with said jack and then returning said carriage to said starting position during continuous movement of said jack in one direction, and mechanism supported by said carriage for forming a concavity in the upper end portion of said blank.

24. In a machine of the character described, a continuously moving jack, mechanism at one side of said jack for inserting a dowel element longitudinally in said blank during continuous movement of said jack and said blank, a carriage supported at the opposite side of said jack, mechanism for moving said carriage from a starting position along with said jack and then returning said carriage to said starting position during continuous movement of said jack in one direction, and mechanism supported by said carriage for forming a concavity in the upper end portion of said blank during continuous movement of said carriage and said last named mechanism from said starting position.

25. In a machine of the character described, a continuously moving jack, means for holding a wood heel blank in said jack, mechanism for rotating said blank in said jack, mechanism for forming a concavity in the upper end portion of said blank during continuous movement of said jack and while said blank is rotating in said jack, and mechanism for imprinting a symbol in said concavity during continuous movement of said jack.

26. In a machine of the character described, a continuously moving jack for supporting and moving a wood heel blank with the longitudinal axis of said blank approximately horizontal, a stationary element holding the blank in said jack during movement of the jack, and mechanism for imprinting a designating symbol on one lateral surface of said blank during continuous movement of said jack and said blank.

27. In a machine of the character described, a continuously moving jack for supporting an article, a carriage movable from and to a starting position at one side of said jack, means for moving said carriage along with said jack and then returning said carriage to said starting position during continuous movement of said jack, and mechanism mounted in said carriage for imprinting a symbol on one surface of said article during movement of said carriage from said starting position.

28. In a machine of the character described, a continuously moving jack for supporting a wood heel blank with the longitudinal axis of said jack approximately horizontal, a stationary element holding the blank in said jack during movement of the jack, and mechanisms laterally from said jack for forming a concavity in one end portion of said blank and then imprinting a designating symbol in said concavity during continuous movement of said jack in one direction.

29. In a machine of the character described, a continuously moving jack for supporting a wood heel blank, mechanism for rotating said wood heel blank during continuous movement of said jack, and mechanism for forming a concavity in one end portion of said wood heel blank during continuous movement of said jack and while said blank is rotating.

30. In a machine of the character described, a continuously moving jack for supporting a wood heel blank, a carriage movable from and to a starting position, cutting mechanism supported by said carriage, mechanism supported by said carriage for operating said cutting mechanism, and means moving said blank relative to said cutting mechanism during operation of said cutting mechanism on said blank.

31. In a machine of the character described, a continuously moving jack for supporting a blank from which an article is to be formed, a carriage movable in opposite directions from and to a starting position, mechanism for moving said carriage from said starting position along with said jack and said blank, and mechanism supported by said carriage for forming a concavity in one side of said blank during movement of said carriage along with said jack.

32. In a machine of the character described, a continuously moving jack for supporting a blank from which an article is to be formed, a carriage movable from and to a starting position, mechanism for moving said carriage from said starting position along with said jack and said blank, mechanism supported by said carriage for forming a concavity in one side of said blank during movement of said carriage along with said jack, and mechanism for moving said blank relative to said mechanism that forms said concavity during operation of said mechanism on said blank.

33. In a machine of the character described, a continuously moving jack for supporting a blank from which an article is to be formed, a carriage movable from and to a starting position, mechanism for moving said carriage from said starting position along with said jack and said blank, mechanism supported by said carriage for forming a concavity in one side of said blank during movement of said carriage along with said jack, mechanism for moving said blank relative to said mechanism that forms said concavity during operation of said mechanism on said blank, and mechanism for imprinting a designating symbol in said concavity during continuous movement of said jack.

34. In a machine of the character described, a continuously moving jack for supporting a wood heel blank, a stationary guide at one side of said jack and along which said blank is moved by said jack, and means at the opposite side of said jack from said guide for forcing a dowel element into said blank.

35. In a machine of the character described, a continuously moving jack for supporting a blank from which an article is to be formed, a stationary guide at one side of said jack for holding said blank in said jack and along which said jack moves said blank, and mechanism at the opposite side of said jack from said guide for forming a hole in said blank.

36. In a machine of the character described, a stationary guide, mechanism for moving and supporting a wood heel blank along said guide, and mechanisms for forming a hole in said blank and inserting a dowel element in said hole during continuous movement of said blank along said guide.

37. In a machine of the character described a continuously moving conveyor, a jack mounted on and continuously moved by said conveyor for supporting a wood heel, a device for forming a shaped surface on said heel during movement thereof by said jack, means for moving said device from a starting position laterally along with said jack during the time that said device is forming said shaped surface on said heel, means for returning said device to said starting position after said shaped surface has been formed thereby on said wood heel preparatory for another operation, mechanism for imprinting a designating symbol on said shaped surface of said wood heel during continuous movement of said jack and said wood heel, and connections for moving said mechanism from a starting position laterally along with said jack and said heel during the time that said mechanism is imprinting said symbol on said shaped surface.

38. In a machine of the character described a continuously moving conveyor, a jack mounted on and continuously moved by said conveyor for supporting a wood heel, a device for forming a shaped surface on said heel during movement thereof by said jack, means for moving said device from a starting position laterally along with said jack during the time that said device is forming said shaped surface on said heel, means for returning said device to said starting position after said shaped surface has been formed thereby on said wood heel preparatory for another operation, mechanism for imprinting a designating symbol on said shaped surface of said wood heel during continuous movement of said jack and said wood heel, connections for moving said mechanism from a starting position laterally along with said jack and said heel during the time that said mechanism is imprinting said symbol on said shaped surface and for returning said mechanism to said starting position, means for engaging and withdrawing said wood heel from said jack after said symbol has been imprinted on said shaped surface, and a device for supporting and guiding said wood heel in a direction away from said jack after said heel has been withdrawn from said jack.

39. In a machine of the character described, a continuously moving jack for supporting a wood heel blank, mechanism for turning said blank during continuous movement of said jack, a carriage movable from and to a starting position, an element supported by said carriage for engaging and holding said blank in said jack, and mechanism supported by said carriage for cutting an adjacent portion of said blank during movement of said carriage along with said jack.

40. In a machine of the character described, a continuously moving jack for supporting a wood heel blank, a carriage movable from and to a starting position, a guide supported by said carriage for engaging and holding said blank in said jack, mechanism for moving said carriage from said starting position along with said jack, and mechanism supported by said carriage for cutting an adjacent portion of said blank while said carriage is moving along with said jack.

41. In a machine of the character described, a continuously moving jack for supporting a wood heel blank, a carriage movable from and to a starting position, a guide supported by said carriage for engaging and holding said blank in said jack, mechanism for moving said carriage from said starting position along with said jack, mechanism supported by said carriage for cutting an adjacent portion of said blank while said carriage is moving along with said jack, and mechanism for turning said blank to present different portions thereof to said cutting mechanism during the time that said cutting mechanism is operating on said blank.

42. In a machine of the character described, a continuously moving jack for supporting a wood heel blank, a carriage movable from and to a starting position, a guide supported by said carriage for engaging and holding said blank in said jack, mechanism for moving said carriage from said starting position along with said jack, mechanism supported by said carriage for cutting an adjacent portion of said blank while said carriage is moving along with said jack, mechanism for turning said blank to present different portions thereof to said cutting mechanism during the time that said cutting mechanism is operating on said blank, and means other than the operating mechanism for the cutting mechanism for moving said cutting mechanism relative to said blank.

43. A machine for concaving the upper ends of wood heels comprising a continuously moving jack for supporting a heel blank with the upper and lower ends thereof in vertical planes, a carriage, mechanism for moving said carriage parallel with said jack, and mechanism supported by said carriage for concaving the adjacent end of the heel blank.

44. In a machine of the character described, a continuously moving jack, means for supporting a wood heel blank in said jack in position in which the upper and lower ends of the heel blank are in approximately vertical planes, and mechanism movable parallel with said jack and laterally therefrom for forming a concavity in the adjacent end of the heel blank.

45. In a machine of the character described, a continuously moving jack, means for supporting a wood heel blank in said jack in position in which the upper and lower ends of the heel blank are in approximately vertical planes, mechanism movable parallel with said jack and laterally therefrom for forming a concavity in the adjacent end of the heel blank, and mechanism for turning the heel blank during the forming of said concavity.

46. In a machine of the character described, a continuously moving jack, means for supporting a wood heel blank in said jack in position in which the upper and lower ends of the heel blank are in approximately vertical planes, mechanism movable parallel with said jack and laterally therefrom for forming a concavity in the adjacent end of the heel blank, and mechanism for drilling a hole in the opposite end of the heel blank.

47. In a machine of the character described, a continuously moving jack, means for supporting a wood heel blank in said jack in position in which the ends of the heel blank are in approximately vertical planes, and mechanism for drilling a hole in one end of the heel blank during continuous movement thereof.

48. In a machine of the character described, a continuously moving jack, means for supporting a wood heel blank in said jack in position in which the ends of the heel blank are in approximately vertical planes, and mechanism for inserting a dowel pin in the heel blank during continuous movement thereof.

49. In a machine of the character described, a continuously moving jack, means for supporting a wood heel blank in said jack in position in which the ends of the heel blank are in approximately vertical planes, and mechanisms for concaving one end of the heel blank and for inserting a dowel pin in the opposite end of the heel blank during continuous movements of said blank.

ANDREW F. HOWE.